United States Patent [19]

Fishinger

[11] 4,289,415

[45] Sep. 15, 1981

[54] ADJUSTABLE COUPLING DEVICE

[75] Inventor: Lawrence W. Fishinger, Denville, N.J.

[73] Assignee: GTE Products Corporation, Stamford, Conn.

[21] Appl. No.: 151,992

[22] Filed: May 21, 1980

[51] Int. Cl.³ .............................................. F16B 7/10
[52] U.S. Cl. .................................. 403/104; 403/341; 403/393; 403/343
[58] Field of Search ............... 403/341, 393, 343, 307, 403/104, 43–48; 248/59, 327

[56] References Cited

U.S. PATENT DOCUMENTS 622,286 4/1899 Steinmetz ............................. 403/44

FOREIGN PATENT DOCUMENTS 2375479 8/1978 France .................................. 403/43

Primary Examiner—Andrew V. Kundrat
Attorney, Agent, or Firm—William R. McClellan

[57] ABSTRACT

An adjustable coupling structure for the support of lighting fixtures, pipe support racks, and the like utilizes an adjustable coupling device to couple two threaded support rods. The coupling device includes a clearance hole and a parallel threaded hole through a rigid body. The minor diameter of the threaded hole is tangent to the clearance hole thereby providing meshing of the threads of the two rods. Adjustment is provided by turning either of the threaded rods.

13 Claims, 4 Drawing Figures

ADJUSTABLE COUPLING DEVICE

BACKGROUND OF THE INVENTION

This invention relates to suspended structures in building construction and, more particularly, to a device which provides adjustable coupling between a pair of threaded rods used in a suspension structure.

In building construction, pipes, lighting fixtures, and ceilings are commonly suspended from an overhead framework by steel support rods which are threaded over part or all of their length. The support rods are rigidly coupled both to the overhead framework and to the suspended device. Therefore, the rod must be cut to the desired length and filed to remove burrs before installation. When large numbers of such steel rods are to be installed, the cutting and deburring operation can be time consuming and inconvenient. Furthermore, little or no adjustment of length is available in such a configuration.

SUMMARY OF THE INVENTION

It is an object of the present invention to provide a new and improved suspension structure which reduces or eliminates the need for cutting and deburring of support rods.

It is another object of the present invention to provide a new and improved suspension structure which is adjustable.

It is yet another object of the present invention to provide a new and improved device for adjustable coupling between two threaded rods.

According to the present invention, these and other objects and advantages are achieved in an adjustable coupling device comprising a rigid body having two holes therethrough. A first hole has a diameter adapted to provide clearance for a first threaded rod of a predetermined diameter and a predetermined thread type. A threaded second hole is adapted for engaging a second threaded rod of the same predetermined diameter and same predetermined thread type. The threaded second hole has a minor thread diameter which is tangent to the first hole and has an axis parallel to an axis of the first hole. When the first and second threaded rods are inserted into the first and second holes, respectively, of the adjustable coupling device, the threads of the first rod engage the threads of the second rod. The device thereby provides between the rods a coupling which can be adjusted by turning either of the rods.

For a better understanding of the present invention, together with other and further objects, advantages, and capabilities thereof, reference is made to the following disclosure and appended claims in connection with the above-described drawings.

DETAILED DESCRIPTION OF THE INVENTION

Figure 1:
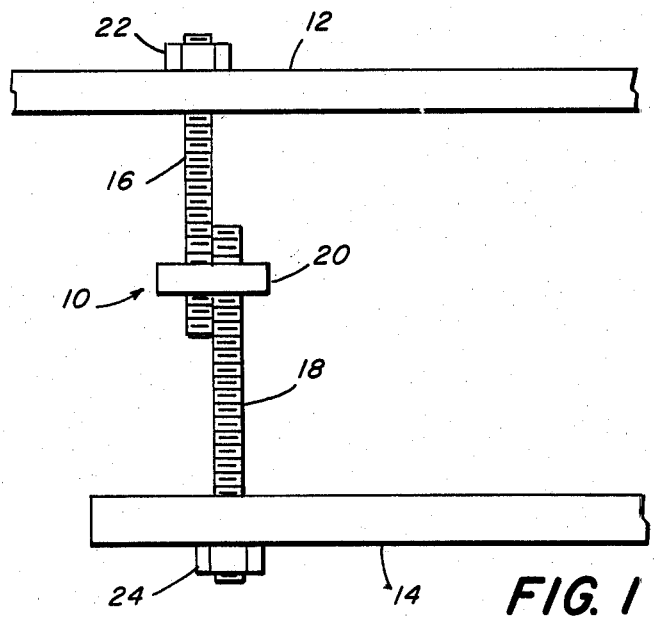
FIG. 1 illustrates an adjustable coupling structure according to the present invention.

An adjustable coupling structure 10 according to the present invention is shown in FIG. 1. The adjustable coupling structure 10 is suspended from a first structure 12 such as an overhead framework and supports a second structure 14 such as a pipe support rack. The adjustable coupling structure 10 includes a first support rod 16 coupled to a second support rod 18 by an adjustable coupling device 20. The support rods 16 and 18 are typically threaded throughout their entire length. One end of the first support rod 16 is adapted for coupling to the first structure 12 such as by a nut 22 threaded onto the support rod 16. The other end of the first support rod 16 is inserted into the coupling device 20. One end of the second support rod 18 is inserted into the coupling device 20. The other end of the second support rod 18 is coupled to the second structure 14 such as by a nut 24 threaded onto the support rod 18. The first support rod 16 and the second support rod 18 are of equal diameter and the same thread type.

Figure 2:
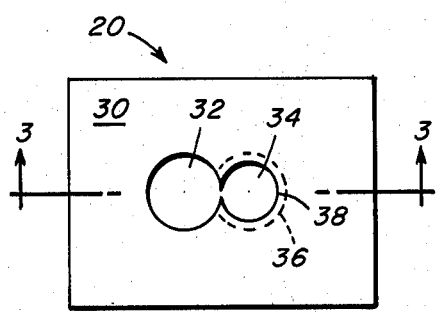
FIG. 2 is a top view of an adjustable coupling device according to the present invention.
Figure 3:
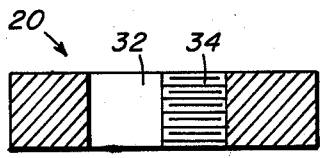
FIG. 3 is a cross-sectional view taken through the line 3—3 of the adjustable coupling device shown in FIG. 2.

Referring now to FIGS. 2 and 3, the adjustable coupling device 20 includes a rigid body 30, typically of a metallic material such as steel, having a first hole 32 therethrough and a threaded second hole 34 therethrough. The holes 32 and 34 are generally cylindrical in shape. The first hole 32 has a diameter which provides clearance for the first support rod 16. A clearance hole is an unthreaded hole having a diameter which is slightly larger than the support rod 16 and which is large enough to permit the support rod 16 to be inserted therein without binding. The threaded second hole 34 has a diameter and a thread which matches the diameter and thread of the second support rod 18. The second hole 34 has an associated major thread diameter 36 which corresponds to the root of the thread and a minor thread diameter 38 which corresponds to the crest of the thread. The first hole 32 and the threaded second hold 34 are so formed in the rigid body 30 that the first hole 32 is tangent to the minor thread diameter 38 of the threaded second hole 34. Furthermore, the axis of the first hole 32 is parallel to the axis of the threaded second hole 34. The rigid body 30 can have any convenient shape but is conveniently cut from a sheet of metal, thus providing it with upper and lower surfaces perpendicular to the first and second holes 32 and 34. The outer periphery of the rigid body 30 connecting the upper and lower surfaces can be a rectangle or a hexagon which provides flat surfaces for a tool to hold the device.

During installation of the adjustable coupling structure 10, the first support rod 16 is inserted directly into the first hole 32 to the desired depth. The second support rod 18 is turned into the threads of the second hole 34 of the adjustable coupling device 20. Because of the relative placement of the first and second holes 32 and 34 as described hereinabove, the threads of the second support rod 18 engage not only the threads of the second hole 34, but also the threads of the first support rod 16 which is inserted in the first hole 32. Thus, the first support rod 16 is secured in the adjustable coupling device 20 by the threads of the second support rod 18 and is prevented from being withdrawn. When either or both of the support rods 16 or 18 are turned in their respective holes, their threads rotate relative to each other and the support rods 16 and 18 move lengthwise relative to each other, thus increasing or decreasing the overall length of the adjustable coupling structure 10.

Because of the adjustability provided by the coupling device 20, exact cutting to length of the support rods 16 and 18 is not required. Support rods of one or a few basic lengths can be used in all applications. The adjustable support structure 10 is assembled to the first structure 12 and the second structure 14 in whatever order is most convenient.

Figure 4:
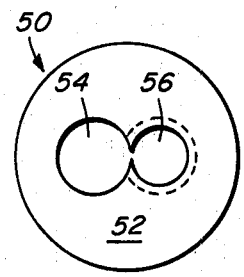
FIG. 4 is a top view of another embodiment of an adjustable coupling device according to the present invention.

An alternate configuration of an adjustable coupling device 50 is shown in FIG. 4. The coupling device 50 includes a rigid body 52 having a first hole 54 therethrough and a threaded second hole 56 therethrough. The first hole 54 and the second hole 56 correspond exactly to the first hole 32 and the second hole 34, respectively, as shown in FIGS. 2 and 3 and described hereinabove. The rigid body 52 has a circular outer periphery. This configuration provides the advantage that the coupling device 50 can be easily fabricated from cylindrical steel stock. Otherwise, the operation of the coupling device 50 is the same as that of the coupling device 20 described hereinabove.

Thus, there is provided an adjustable coupling device which permits quick and easy adjustment of support rods for pipe support racks, etc. and eliminates precise cutting and deburring thereof.

While there has been shown and described what is at present considered the preferred embodiments of the present invention, it will be obvious to those skilled in the art that various changes and modifications may be made therein without departing from the scope of the invention as defined by the appended claims.

What is claimed is:

1. An adjustable coupling device comprising:
a single-piece rigid body including an unthreaded first hole therethrough of a diameter adapted to provide clearance for a first threaded rod of a predetermined diameter and a predetermined thread type and including a threaded second hole which is adapted for engaging a second threaded rod of said predetermined diameter and said predetermined thread type, said threaded second hole having a minor thread diameter which is tangent to said first hole and having an axis parallel to an axis of said first hole, whereby, when said first and second threaded rods are inserted into said first and second holes, respectively, of said adjustable coupling device, the threads of said first rod engage the threads of said second rod, said device thereby providing between said rods a coupling which can be adjusted by turning either of said rods.

2. The adjustable coupling device as defined in claim 1 wherein said rigid body includes upper and lower surfaces perpendicular to said first and second holes.

3. The adjustable coupling device as defined in claim 2 wherein said rigid body includes at least two flat surfaces on opposite sides of said rigid body to facilitate the holding of said device by a tool.

4. The adjustable coupling device as defined in claim 3 wherein said rigid body is a metallic material.

5. The adjustable coupling device as defined in claim 4 wherein said rigid body is steel.

6. The adjustable coupling device as defined in claim 5 wherein an outer periphery connecting said upper and lower surfaces is rectangular in shape.

7. The adjustable coupling device as defined in claim 2 wherein an outer periphery connecting said upper and lower surfaces is circular in shape.

8. An adjustable coupling structure comprising:
a first support rod having one end adapted for coupling to a first structure and an other end which is threaded;
a second support rod having one end which is threaded and an other end adapted for coupling to a second structure, said first and second rods having equal diameters and the same thread type; and
an adjustable coupling device including a single-piece rigid body having an unthreaded first hole therethrough of a diameter which provides clearance for said threaded end of said first rod and having a threaded second hole therethrough which engages said threaded end of said second rod, said threaded second hole having a minor thread diameter which is tangent to said first hole and having an axis parallel to an axis of said first hole,
whereby, when said first and second rods are inserted into said first and second holes, respectively, of said adjustable coupling device, the threads of said first rod engage the threads of said second rod, said coupling device thereby providing between said rods a coupling which can be adjusted by turning either of said rods.

9. The adjustable coupling structure as defined in claim 8 wherein said coupling structure is adapted to be suspended from said first structure.

10. The adjustable coupling structure as defined in claim 9 wherein said adjustable coupling device includes upper and lower surfaces perpendicular to said first and second holes and a rectangular outer periphery connecting said upper and lower surfaces.

11. The adjustable coupling structure as defined in claim 10 wherein said adjustable coupling device is steel.

12. The adjustable coupling structure as defined in claim 9 wherein said adjustable coupling device includes upper and lower surfaces perpendicular to said first and second holes and a circular outer periphery connecting said upper and lower surfaces.

13. The adjustable coupling structure as defined in claim 12 wherein said adjustable coupling device is steel.

* * * * *